(12) United States Patent
Mosca et al.

(10) Patent No.: US 12,326,883 B2
(45) Date of Patent: Jun. 10, 2025

(54) SYSTEMS AND METHODS FOR DETECTING MISCATEGORIZED TEXT-BASED OBJECTS

(71) Applicant: JPMORGAN CHASE BANK, N.A., New York, NY (US)

(72) Inventors: Francesca Mosca, London (GB); Jessica Staddon, Redwood City, CA (US); Vineeth Ravi, Jersey City, NJ (US); Simran Lamba, Manhattan, NY (US); Jay Katukuri, San Jose, CA (US); Cecilia Tilli, London (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 18/498,936

(22) Filed: Oct. 31, 2023

(65) Prior Publication Data

US 2025/0139135 A1     May 1, 2025

(51) Int. Cl.
*G06F 16/00* (2019.01)
*G06F 16/31* (2019.01)

(52) U.S. Cl.
CPC ................... *G06F 16/313* (2019.01)

(58) Field of Classification Search
CPC ..................................................... G06F 16/313
USPC .................................................. 707/600–899
See application file for complete search history.

(56) References Cited

U.S. PATENT DOCUMENTS

| | | | | |
|---|---|---|---|---|
| 11,030,484 B2* | 6/2021 | Walters | ................ | G06F 18/214 |
| 12,198,030 B1* | 1/2025 | Mysore | ................ | G06N 20/20 |
| 2018/0329999 A1* | 11/2018 | Kale | ................ | G06F 16/2455 |
| 2023/0315768 A1* | 10/2023 | Cainey | ................ | G06F 16/3344 |
| | | | | 707/769 |
| 2025/0005896 A1* | 1/2025 | Liu | ................ | G06V 10/82 |

\* cited by examiner

*Primary Examiner* — Michelle N Owyang
(74) *Attorney, Agent, or Firm* — GREENBERG TRAURIG LLP (57) ABSTRACT

In some aspects, the techniques described herein relate to a method including: receiving, as input to a binary search process, a subject vector embedding and a class vector embedding, wherein the subject vector embedding is generated from a plurality of subject text strings and wherein the class vector embedding is generated from a class text string; generating a similarity score; determining that the similarity score is below a threshold value; splitting the plurality of subject text strings into a first new plurality of subject text strings and a second new plurality of subject text strings; receiving a new subject vector embedding, wherein the new subject vector embedding is generated from the first new plurality of subject text strings; and calling the binary search process recursively using the new subject vector embedding and the class vector embedding as input to the binary search process.

6 Claims, 4 Drawing Sheets

SYSTEMS AND METHODS FOR DETECTING MISCATEGORIZED TEXT-BASED OBJECTS

BACKGROUND

1. Field of the Invention

Aspects generally relate to systems and methods for detecting miscategorized text-based objects.

2. Description of the Related Art

Textual data is often more valuable if it is structured in some way. One way to structure textual data is by categorizing it in terms of what a particular string of text represents. For instance, if a string of text represents a merchant's name, then that text may be placed into a "merchant" category. If a string of text represents an animal, then that string of text may be categorized in an "animal" category, and so on. Categories may then be divided further into subcategories. For instance, an animal may be subcategorized as a mammal, a bird, a fish, a reptile, etc. A merchant may be categorized by the goods and/or services that the merchant offers.

In order to effectively incorporate classifications in learning, business, and other undertakings, it is essential that classifications of objects are accurate. For a variety of reasons, however, when dealing with massive data sets individual data points often become misclassified. It can be very difficult to detect such misclassifications in large data sets. And, if misclassifications cannot be detected, they cannot be corrected.

SUMMARY

In some aspects, the techniques described herein relate to a method including: receiving, at a scoring engine and as input to a binary search process, a subject vector embedding and a class vector embedding, wherein the subject vector embedding is generated from a plurality of subject text strings and wherein the class vector embedding is generated from a class text string; generating, by the scoring engine, a similarity score, wherein the similarity score is a measurement of similarity between the subject vector embedding and the class vector embedding; determining, by the scoring engine, that the similarity score is below a threshold value; splitting, by the scoring engine, the plurality of subject text strings into a first new plurality of subject text strings and a second new plurality of subject text strings; receiving, by the scoring engine, a new subject vector embedding, wherein the new subject vector embedding is generated from the first new plurality of subject text strings; and calling, by the scoring engine, the binary search process recursively using the new subject vector embedding and the class vector embedding as input to the binary search process.

In some aspects, the techniques described herein relate to a method, wherein the plurality of subject text strings and the class text string are stored in and retrieved from a classification datastore.

In some aspects, the techniques described herein relate to a method, including: querying the classification datastore using the class text string as a lookup key.

In some aspects, the techniques described herein relate to a method, wherein querying the classification datastore returns the plurality of subject text strings.

In some aspects, the techniques described herein relate to a method, including: concatenating the plurality of subject text strings into a single-subject string.

In some aspects, the techniques described herein relate to a method, wherein the single-subject string includes a separation character between each subject text string of the plurality of subject text strings.

In some aspects, the techniques described herein relate to a method, wherein the plurality of subject text strings are split at one of the separation character between each subject text string of the plurality of subject text strings.

In some aspects, the techniques described herein relate to a system including at least one computer including a processor and a memory, wherein the at least one computer is configured to: receive, at a scoring engine and as input to a binary search process, a subject vector embedding and a class vector embedding, wherein the subject vector embedding is generated from a plurality of subject text strings and wherein the class vector embedding is generated from a class text string; generate, by the scoring engine, a similarity score, wherein the similarity score is a measurement of similarity between the subject vector embedding and the class vector embedding; determine, by the scoring engine, that the similarity score is below a threshold value; split, by the scoring engine, the plurality of subject text strings into a first new plurality of subject text strings and a second new plurality of subject text strings; receive, by the scoring engine, a new subject vector embedding, wherein the new subject vector embedding is generated from the first new plurality of subject text strings; and call, by the scoring engine, the binary search process recursively using the new subject vector embedding and the class vector embedding as input to the binary search process.

In some aspects, the techniques described herein relate to a system, wherein the plurality of subject text strings and the class text string are stored in and retrieved from a classification datastore.

In some aspects, the techniques described herein relate to a system, wherein the at least one computer is configured to: query the classification datastore using the class text string as a lookup key.

In some aspects, the techniques described herein relate to a system, wherein querying the classification datastore returns the plurality of subject text strings.

In some aspects, the techniques described herein relate to a system, wherein the at least one computer is configured to: concatenate the plurality of subject text strings into a single-subject string.

In some aspects, the techniques described herein relate to a system, wherein the single-subject string includes a separation character between each subject text string of the plurality of subject text strings.

In some aspects, the techniques described herein relate to a system, wherein the plurality of subject text strings are split at one of the separation character between each subject text string of the plurality of subject text strings.

In some aspects, the techniques described herein relate to a non-transitory computer readable storage medium, including instructions stored thereon, which instructions, when read and executed by one or more computer processors, cause the one or more computer processors to perform steps including: receiving, at a scoring engine and as input to a binary search process, a subject vector embedding and a class vector embedding, wherein the subject vector embedding is generated from a plurality of subject text strings and wherein the class vector embedding is generated from a class text string; generating, by the scoring engine, a similarity score, wherein the similarity score is a measurement of similarity between the subject vector embedding and the class vector embedding; determining, by the scoring engine, that the similarity score is below a threshold value; splitting, by the scoring engine, the plurality of subject text strings into a first new plurality of subject text strings and a second new plurality of subject text strings; receiving, by the scoring engine, a new subject vector embedding, wherein the new subject vector embedding is generated from the first new plurality of subject text strings; and calling, by the scoring engine, the binary search process recursively using the new subject vector embedding and the class vector embedding as input to the binary search process.

In some aspects, the techniques described herein relate to a non-transitory computer readable storage medium, wherein the plurality of subject text strings and the class text string are stored in and retrieved from a classification datastore.

In some aspects, the techniques described herein relate to a non-transitory computer readable storage medium, including: querying the classification datastore using the class text string as a lookup key.

In some aspects, the techniques described herein relate to a non-transitory computer readable storage medium, wherein querying the classification datastore returns the plurality of subject text strings.

In some aspects, the techniques described herein relate to a non-transitory computer readable storage medium, including: concatenating the plurality of subject text strings into a single-subject string.

In some aspects, the techniques described herein relate to a non-transitory computer readable storage medium, wherein the single-subject string includes a separation character between each subject text string of the plurality of subject text strings, and wherein the plurality of subject text strings are split at one of the separation character between each subject text string of the plurality of subject text strings.

In some aspects, the techniques described herein relate to a method including: receiving, at a scoring engine, a first vector embedding, wherein the first vector embedding is generated from a first subject text string; generating, by the scoring engine and for each vector embedding of a plurality of vector embeddings, a corresponding similarity score, wherein each vector embedding of the plurality of vector embeddings is generated from a set of subject text strings included in a same classification scheme as the first vector embedding; determining, by the scoring engine, a number of vector embeddings from the plurality of vector embeddings that have a similarity score that is most similar to the first vector embedding; determining a class text string that is associated with each of the number of vector embeddings; determining a most common related class text string among the class text strings that are associated with each of the number of vector embeddings; and mapping a relation from the first subject text string to the most common related class text string in a classification datastore.

DETAILED DESCRIPTION

Aspects generally relate to systems and methods for detecting miscategorized text-based objects.

Aspects may provide a class verification platform that takes one or more text strings that represent a member of a class (also referred to herein as a "subject text string") and one or more text strings that represent a category from one or more classification schemes (also referred to herein as a "class text string") and determines a similarity between the subject text string and the class text string. Aspects may use language models to generate embeddings of subject text strings and class text strings and may provide logic to determine a similarity (e.g., a similarity score) between the embeddings. Aspects may execute logic that outputs a determination or a level of confidence that one or more subject text strings is properly included in a category represented by a class text string.

There are organizations that provide documented classifications of various objects. In an exemplary aspect with respect to businesses, merchant category codes (MCCs) are assigned to a merchant by a payment product issuer (e.g., a payment card issuer) when the merchant begins using the issuer's payment product. An MCC is assigned to a business based on the types of goods and services that the business provides. Another exemplary aspect of business classification is the Interactive Advertising Bureau (IAB) categories. IAB categories are standard classifications that publishers and brands use to categorize web content and improve targeting. These exemplary categorization schemes are text-based and relational in form. That is, they may be stored in a relational database, a flat file form, or any other format that can maintain the noted relationship between a subject text string and a class text string. Many businesses use this type of data in business operations.

While classification data, such as that noted above, is often helpful to businesses, it can be difficult to determine errors in classifications. This is due to the fact that a subject text string may be undescriptive and/or unrecognizable. For instance, a restaurant denoted in the subject text string "The Gray Room" does not necessarily describe a restaurant or even any relation to food service. It also may not be widely known in its industry or outside of a local market. Accordingly, a classification error may be difficult to determine, even through a manual review.

In other aspects, there may be additional public information (e.g., additional textual data) that can be acquired in order to make a subject text string more robust. For instance, a company may have a website, an online encyclopedia page, or other sources of textual description that may be used as additional data in a subject text string. Such additional information may be retrieved with the use of, e.g., commercial large language model (LLM) interfaces, where a prompt may receive initial input (such as an initial subject text string) and the LLM interface may return, in response to the input, contextual information about the initial subject text string. Some or all of this contextual information may be appended to the initial subject text string in order to produce a more robust subject text string for analysis.

In accordance with aspects, it is contemplated that if a numerical representation of the semantic meaning of two things is similar, then there is a strong possibility (even a likelihood) that the two things are similar with respect to how they may be classified. In the present context, this possibility or likelihood can be projected onto a classification verification scheme. For instance, if vector embeddings (i.e., the numerical representation) of a subject text string and those of a class text string are similar above a certain threshold, then this similarity is a strong signal that a categorization relationship mapping between the subject text string and the class text string is accurate. Moreover, it can be said that if a subject text string is more similar to a class text string different from the one it is currently mapped to, that is a strong signal for an incorrect or inaccurate classification mapping relationship. Accordingly, vector embeddings of subject text strings and class text strings can be evaluated in order to determine a similarity between the two and, consequently, the accuracy of a categorization mapping or a potential categorization mapping between the two.

In accordance with aspects, a class verification platform may include a datastore (e.g., a classification datastore) that includes classification data. Classification data may include a plurality of subject text strings and associated class text strings. Exemplary subject text strings may include doing-business-as (DBA) names of organizations. Exemplary class text strings may include merchant category codes that describe a class. Each subject text string may be stored with a mapping or relationship to a class text string. Each class text string may include or be stored with a mapping or relationship to a description of the class that the class text string represents. For instance, an MCC that is a string of number characters (e.g., a four-digit numeric code) may be mapped to a textual description of the class that the numeric code represents, while several subject text strings are mapped to the class text string. In this way, a query of the datastore may produce subject text strings given a class text string, the class text string and description that a subject text string is mapped to and other combinations thereof, depending on the query's construction.

In accordance with aspects, a class verification platform may include a modeling engine. A modeling engine may be configured to execute one or more machine learning models. A machine learning (ML) model may be configured to receive input and generate output based on the received input. Exemplary output may include a vector embedding, based on the input. For instance, a ML model may include an encoder that encodes text strings into vector embeddings. An exemplary modeling engine may include a language model based on the transformer architecture that is configured to receive textual input (such as one or more subject text strings or one or more class text strings) and generate a vector embedding based on the input. An exemplary aspect may include a Bidirectional Encoder Representations from Transformers (BERT) based model, such as MiniLM, MPnet, etc. A language model may generate a vector embedding from word(s), sentences, descriptions, and/or groups of the forgoing.

In accordance with aspects, a class verification platform may include a scoring engine that receives vector embeddings of inputs and generates a similarity score based on received vector embeddings. A similarity score may be based on cosine similarity, L2 norm similarity, or some other similarity measurement or metric. A similarity score may be, e.g., a number between 0 and 1, where a value closer to 1 indicates that two inputs are relatively similar in semantic terms, and a number closer to 0 indicates that two inputs are relatively different in semantic terms.

In some aspects, a scoring engine may include executable logic that may perform a binary search process. A binary search process may be executed and recursively called (initiated) by the scoring engine. For instance, a scoring engine may take, e.g., a first string input and a second string input. The first string input may include one or more subject text strings (e.g., a DBA name of an organization). The second string input may include a class text string (e.g., an MCC, an IAB classification code, etc.). The first and second string inputs may be retrieved from a classification datastore that stores subject string inputs and corresponding class text string inputs.

In accordance with aspects, a scoring engine may query a classification datastore using a class text string as a lookup key, and the query may return a number of subject text strings associated with the class text string. The returned number of subject text strings may be concatenated into a single subject string input. The single subject string input may include a separation character (e.g., a comma, a dash, an asterisk, etc.) between the end of a first individual subject text string and the beginning of another individual subject text string included in the single subject string. The separation character may not be considered by, or may be stripped out of input data by, a modeling engine. Logic in a scoring engine may use a separation character as a point of separation, however, in a splitting procedure that splits a single subject string input (discussed in more detail, below).

In accordance with aspects, a binary search process may retrieve a plurality of subject text strings from a classification datastore using a related class text string as a lookup key. The binary search process may generate a single subject string (i.e., an aggregation or concatenation of a plurality of individual subject text strings separated by a separation character) from the plurality of subject text stings. A binary search function may provide the single subject string and the related class text string as input to a language model of a modeling engine. The language model may receive the single subject string and the class text string as input and may output a vector embedding for the single subject string and a vector embedding for the class text string instance. Output from the model/modeling engine may be sent back to the scoring engine.

The binary search process may generate a similarity score based on the vector embedding for the single subject string and the vector embedding for the class text string instance as input to a scoring algorithm executed by the scoring engine. The binary search process may compare the similarity score to a threshold value. If the similarity score is equal to or greater than the threshold value, then each subject text string in the single subject string input may be determined to be correctly classified under the class text string input. If, however, the similarity score is less than the threshold score, then the binary search process may execute a splitting procedure and call the binary search process, recursively.

In accordance with aspects, a splitting procedure may split an original single subject string into a first new single subject string and a second new single subject string, each including some of the subject text strings that were included in the original single subject string. The splitting procedure may split the original single subject string to include half of the subject text strings included in the original single subject string in the first new single subject string and half of the subject text strings included in the original single subject string in the second new single subject string. In the case of any remainders (i.e., in the case of an odd number of subject text strings included in the original single subject string), the splitting procedure may be configured to place the remainder in one of the new single subject strings (e.g., randomly, or consistently).

In accordance with aspects, a binary search procedure may then call itself recursively using one of the newly generated single subject strings (i.e., the first new single subject string or the second new single subject string) as input to the binary search procedure along with the original class text string, and the procedure may execute as described above. The recursive cycle may continue until a similarity score based on the current new single subject string is higher than a threshold value, or until there is only a single subject text string included in the single subject string (which the splitting procedure cannot split). At this point, the single subject text string will either be equal to or greater than the threshold value, in which case it will be determined to be correctly classified under the class text string input, or it will be lower than the threshold value, and it will be determined to be misclassified with respect to the class text string input.

In accordance with aspects, the binary search process may store each new single subject string that is not used in a recursive call and provide each new single subject string as input to the binary search process along with the original class text string. This may continue until every newly generated single subject string is used as input to the binary search process, and every subject text string is determined to be either correctly classified or misclassified with respect to the original class text string.

For each subject text string that is determined to be misclassified, the binary search process may create a flag or other communication to an end user indicating that the subject text string was determined to be misclassified. An end user may, then, manually verify the subject text string's classification. In some aspects, when a misclassification is detected, a clustering process (described in more detail, below) may be executed to reclassify the misclassified subject text string.

In accordance with aspects, threshold values of a binary search process may be provided on a sliding scale based on an amount of subject text strings in any given single subject string. For instance, where a single subject string includes greater than, e.g., four subject text strings, the threshold value may be set to a first value (e.g., 0.55). Conversely, where a single subject string includes less than 4 subject text strings, the threshold value may be set to, e.g., 0.10. The various threshold values may be hard-coded or may be dynamically set.

In accordance with aspects, a scoring engine may include executable logic of a clustering process. A clustering process may be used to detect inaccuracies in a relational mapping of a subject text string to a class text string in a classification datastore (i.e., a misclassification). In some aspects, a clustering process may be used to re-classify a detected misclassification of a subject text string.

In accordance with aspects, a clustering process may receive, as input, a vector embedding of a subject text string and may execute a comparison of a set of embeddings of subject text strings, where each subject text string in the set of subject text strings is used in a same or similar classification scheme as the subject text string received as input. The clustering process may determine a similarity score between the input subject text string and each subject text string in the set of subject text strings. The clustering process may then select a number of subject text strings from the set of subject text strings that have the highest similarity scores with respect to the input subject text string (e.g., the K most similar subject text strings).

After selecting a number of the most similar subject text strings from the set of subject text strings, each class text string for each of the most similar subject text strings from the set of subject text strings may be identified, and the most common related class text string determined among the subject text strings from the set of subject text strings may be determined as an accurate class text string for classifying the input subject text string under. A voting technique and logic may be executed, such as majority rule logic, to detect the accurate class text string for (re)classification of the input subject text string.

A clustering process may re-map a relational mapping from the input text string to the determined accurate class text string in, e.g., a classification datastore. Additionally, a vector database may be used to store vectors generated from a number of subject text strings so that encoding of vector embeddings from subject text strings and/or class text strings may be performed prior to execution of a clustering process. A clustering process may use vector embeddings from a vector database as input and may further use a vector database for searching and comparing when generating similarity scores.

Figure 1:
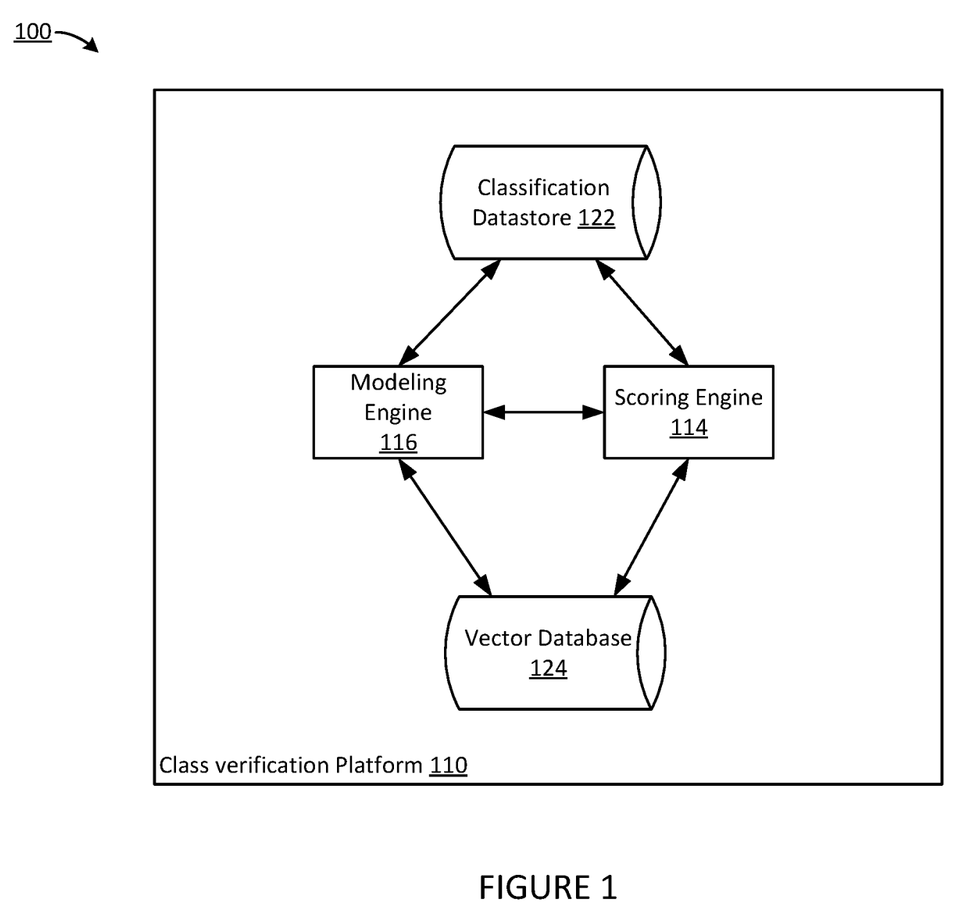
FIG. 1 is a block diagram of a system for detecting miscategorized text-based objects.

FIG. 1 is a block diagram of a system for detecting miscategorized text-based objects. System 100 includes class verification platform 110, which includes scoring engine 114, modeling engine 116, classification datastore 122, and vector database 124. Class verification platform 110 may be part of an implementing organization's technology infrastructure.

In accordance with aspects, classification datastore 122 may store classification data. For instance, classification data stored in classification datastore 122 may include a plurality of subject text strings and associated class text strings. Exemplary subject text strings may include doing-business-as (DBA) names of organizations. Exemplary class text strings may include merchant category codes that describe a class. Each subject text string may be stored in classification datastore 122 with a mapping or relationship to a class text string. Each class text string may include or be stored with a mapping or relationship to a description of the class that the class text string represents. Accordingly, a query of classification datastore 122 may produce subject text strings given a class text string, the class text string and description that a subject text string is mapped to, and/or other combinations of the stored data, depending on the query's construction. Classification datastore 122 may be any suitable datastore, such as a relational database, a flat-file architecture, a key-value pair structure, etc.

Class verification platform 110 further includes modeling engine 116. Modeling engine 116 may be configured to execute one or more machine learning models. A machine learning (ML) model may be configured to receive input and generate output based on the received input. Exemplary output may include a vector embedding, based on the input. For instance, modeling engine 116 may include an encoder that encodes text strings into vector embeddings. Modeling engine 116 may include a language model based on the transformer architecture that is configured to receive textual input (such as one or more subject text strings or one or more class text strings) and generate a vector embedding based on the input. An exemplary aspect may include a Bidirectional Encoder Representations from Transformers (BERT) based model, such as MiniLM, MPnet, etc. The language model may generate a vector embedding from word(s), sentences, descriptions, and/or groups of the forgoing.

Class verification platform 110 includes vector database 124. Vector database 124 may be configured to store vectors generated by modeling engine 116. In some aspects, modeling engine 116 may be configured to generate and store vector embeddings of data in classification datastore 122.

Modeling engine 116 may preprocess data from classification datastore 122 and store vector embeddings of data therein in vector database 124. Components of class verification platform 110, such as scoring engine 114, may be able to search for and use vector embeddings stored in vector database 124 in operations described herein. Accordingly, modeling engine 116 may not be required to process embeddings in real time for operations such as binary search procedures and clustering processes. Vector database 124 may be any suitable datastore for efficiently storing vector embeddings and may be optimized for vector searching/querying.

Class verification platform 110 also includes scoring engine 114. Scoring engine 114 may be configured to receive vector embeddings as input and generate a similarity score between received vector embeddings as output. A similarity score may be based on cosine similarity, L2 norm similarity, or some other similarity measurement or metric. A similarity score may be, e.g., a number between 0 and 1, where a value closer to 1 indicates that two inputs are relatively similar in semantic terms, and a number closer to 0 indicates that two inputs are relatively different in semantic terms. Scoring engine 114 may be configured to execute logical flows that carryout procedures and processes described herein, such as binary search processes, splitting procedures, and clustering processes.

Figure 2:
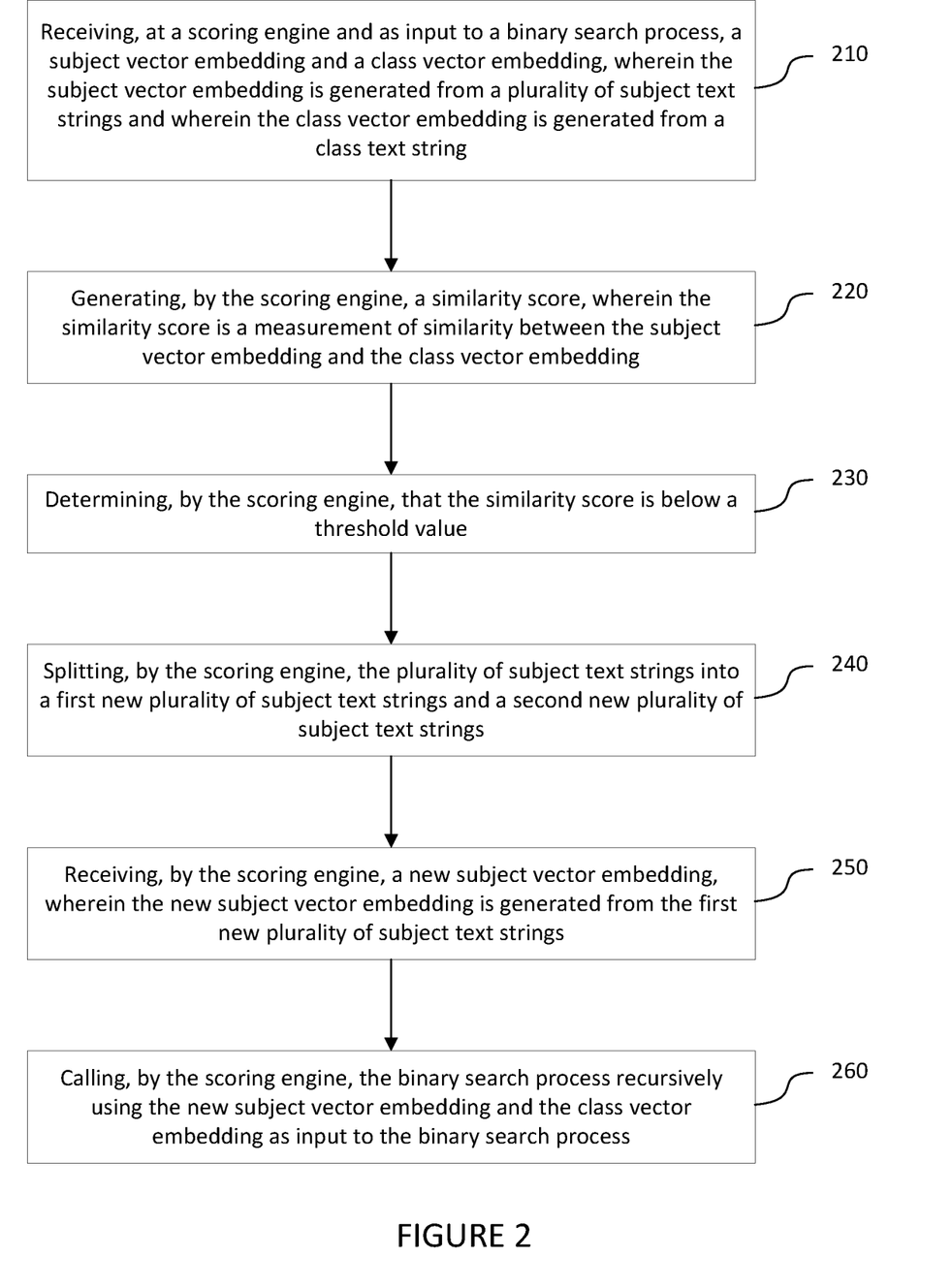
FIG. 2 is a logical flow for detecting miscategorized text-based objects, in accordance with aspects.

FIG. 2 is a logical flow for detecting miscategorized text-based objects, in accordance with aspects.

Step 210 includes receiving, at a scoring engine and as input to a binary search process, a subject vector embedding and a class vector embedding, wherein the subject vector embedding is generated from a plurality of subject text strings and wherein the class vector embedding is generated from a class text string.

Step 220 includes generating, by the scoring engine, a similarity score, wherein the similarity score is a measurement of similarity between the subject vector embedding and the class vector embedding.

Step 230 includes determining, by the scoring engine, that the similarity score is below a threshold value.

Step 240 includes splitting, by the scoring engine, the plurality of subject text strings into a first new plurality of subject text strings and a second new plurality of subject text strings.

Step 250 includes receiving, by the scoring engine, a new subject vector embedding, wherein the new subject vector embedding is generated from the first new plurality of subject text strings.

Step 260 includes calling, by the scoring engine, the binary search process recursively using the new subject vector embedding and the class vector embedding as input to the binary search process.

Figure 3:
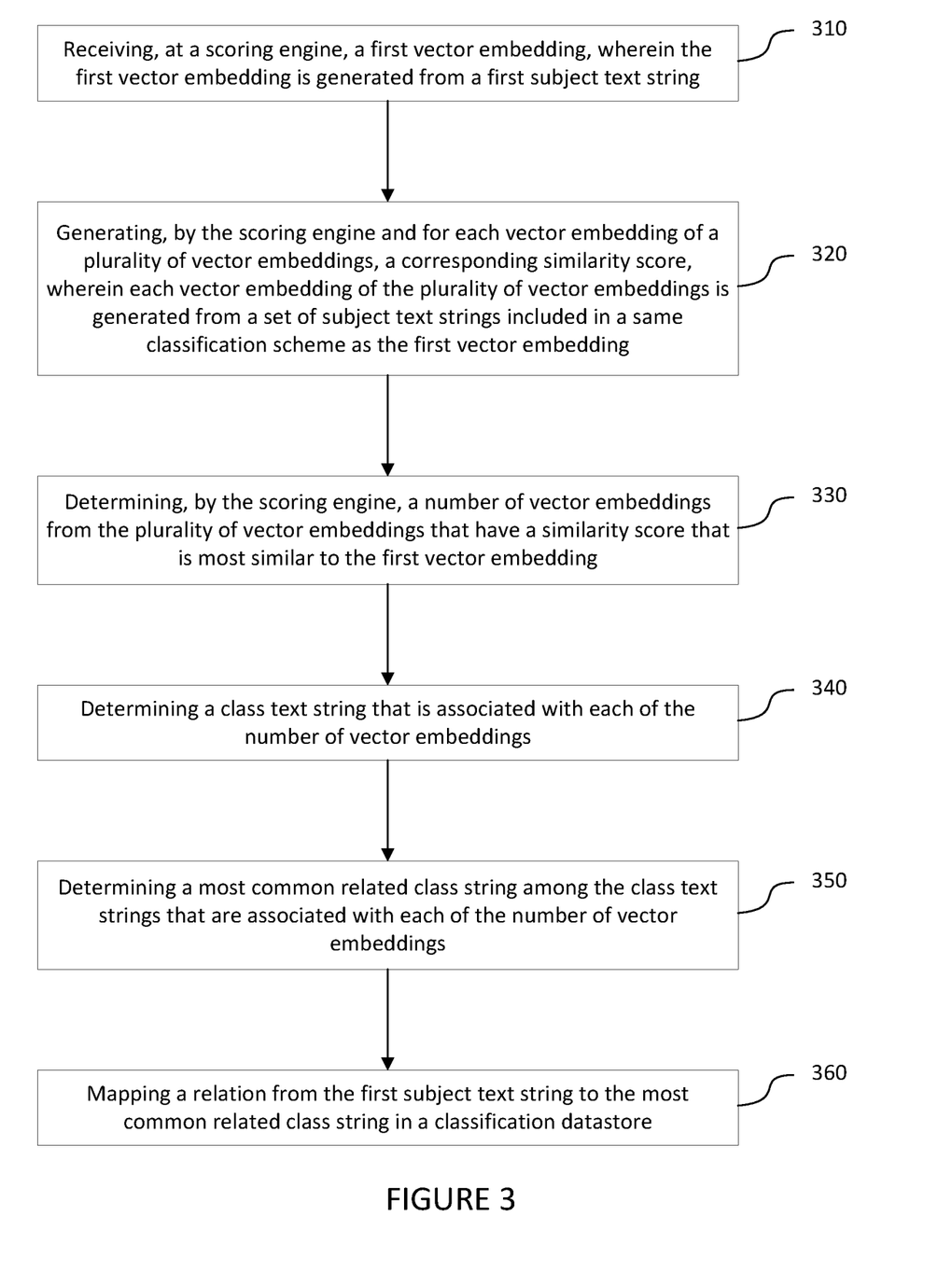
FIG. 3 is a logical flow for detecting miscategorized text-based objects, in accordance with aspects.

FIG. 3 is a logical flow for detecting miscategorized text-based objects, in accordance with aspects.

Step 310 includes receiving, at a scoring engine, a first vector embedding, wherein the first vector embedding is generated from a first subject text string]

Step 320 includes generating, by the scoring engine and for each vector embedding of a plurality of vector embeddings, a corresponding similarity score, wherein each vector embedding of the plurality of vector embeddings is generated from a set of subject text strings included in a same classification scheme as the first vector embedding.

Step 330 includes determining, by the scoring engine, a number of vector embeddings from the plurality of vector embeddings that have a similarity score that is most similar to the first vector embedding.

Step 340 includes determining a class text string that is associated with each of the number of vector embeddings.

Step 350 includes determining a most common related class text string among the class text strings that are associated with each of the number of vector embeddings.

Step 360 includes mapping a relation from the first subject text string to the most common related class text string in a classification datastore.

Figure 4:
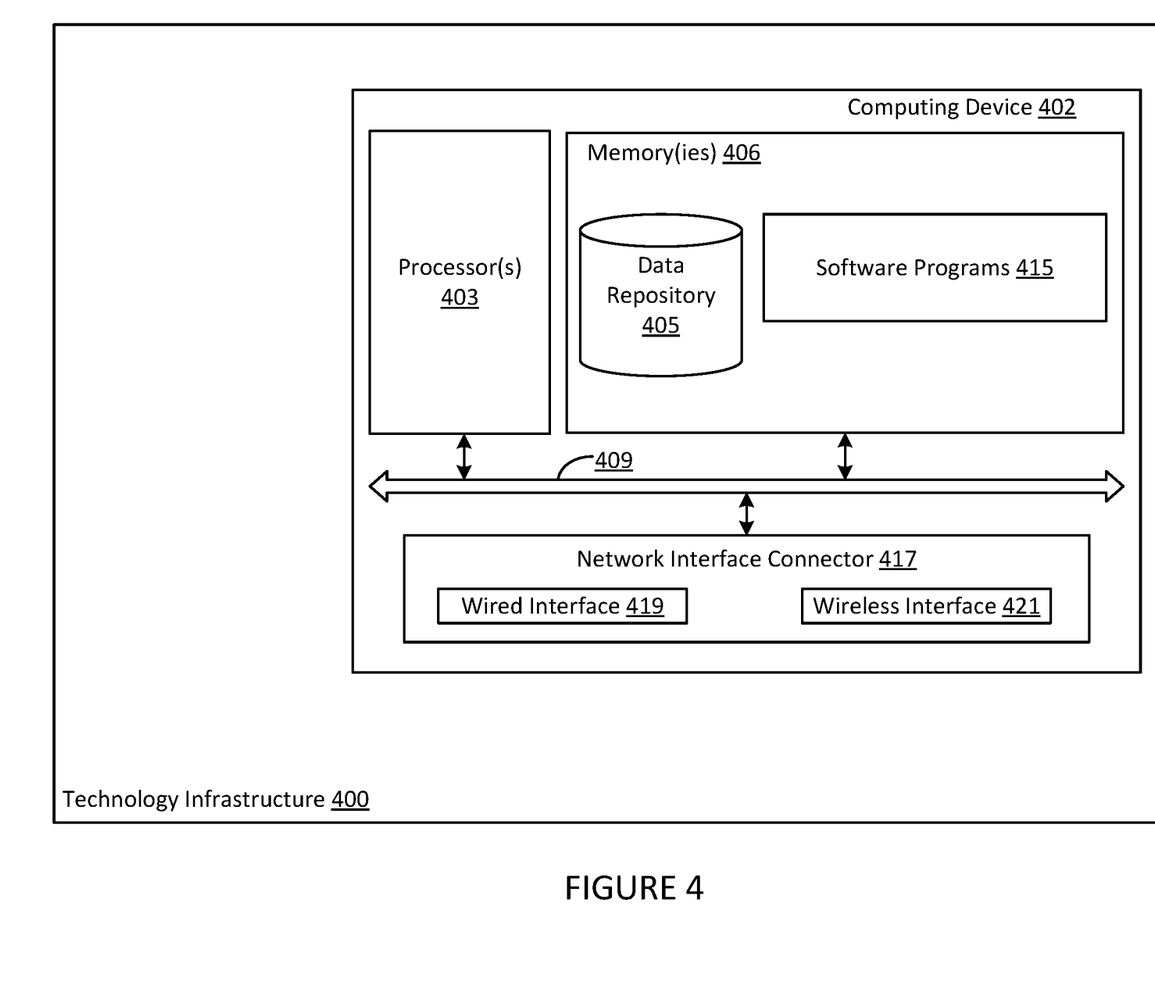
FIG. 4 is a block diagram of a technology infrastructure and computing device for implementing certain aspects of the present disclosure, in accordance with aspects.

FIG. 4 is a block diagram of a technology infrastructure and computing device for implementing certain aspects of the present disclosure, in accordance with aspects. FIG. 4 includes technology infrastructure 400. Technology infrastructure 400 represents the technology infrastructure of an implementing organization. Technology infrastructure 400 may include hardware such as servers, client devices, and other computers or processing devices. Technology infrastructure 400 may include software (e.g., computer) applications that execute on computers and other processing devices. Technology infrastructure 400 may include computer network mediums, and computer networking hardware and software for providing operative communication between computers, processing devices, software applications, procedures and processes, and logical flows and steps, as described herein.

Exemplary hardware and software that may be implemented in combination where software (such as a computer application) executes on hardware. For instance, technology infrastructure 400 may include webservers, application servers, database servers and database engines, communication servers such as email servers and SMS servers, client devices, etc. The term "service" as used herein may include software that, when executed, receives client service requests and responds to client service requests with data and/or processing procedures. A software service may be a commercially available computer application or may be a custom-developed and/or proprietary computer application. A service may execute on a server. The term "server" may include hardware (e.g., a computer including a processor and a memory) that is configured to execute service software. A server may include an operating system optimized for executing services. A service may be a part of, included with, or tightly integrated with a server operating system. A server may include a network interface connection for interfacing with a computer network to facilitate operative communication between client devices and client software, and/or other servers and services that execute thereon.

Server hardware may be virtually allocated to a server operating system and/or service software through virtualization environments, such that the server operating system or service software shares hardware resources such as one or more processors, memories, system buses, network interfaces, or other physical hardware resources. A server operating system and/or service software may execute in virtualized hardware environments, such as virtualized operating system environments, application containers, or any other suitable method for hardware environment virtualization.

Technology infrastructure 400 may also include client devices. A client device may be a computer or other processing device including a processor and a memory that stores client computer software and is configured to execute client software. Client software is software configured for execution on a client device. Client software may be configured as a client of a service. For example, client software may make requests to one or more services for data and/or processing of data. Client software may receive data from, e.g., a service, and may execute additional processing, computations, or logical steps with the received data. Client software may be configured with a graphical user interface such that a user of a client device may interact with client computer software that executes thereon. An interface of client software may facilitate user interaction, such as data entry, data manipulation, etc., for a user of a client device.

A client device may be a mobile device, such as a smart phone, tablet computer, or laptop computer. A client device may also be a desktop computer, or any electronic device that is capable of storing and executing a computer application (e.g., a mobile application). A client device may include a network interface connector for interfacing with a public or private network and for operative communication with other devices, computers, servers, etc., on a public or private network.

Technology infrastructure 400 includes network routers, switches, and firewalls, which may comprise hardware, software, and/or firmware that facilitates transmission of data across a network medium. Routers, switches, and firewalls may include physical ports for accepting physical network medium (generally, a type of cable or wire e.g., copper or fiber optic wire/cable) that forms a physical computer network. Routers, switches, and firewalls may also have "wireless" interfaces that facilitate data transmissions via radio waves. A computer network included in technology infrastructure 400 may include both wired and wireless components and interfaces and may interface with servers and other hardware via either wired or wireless communications. A computer network of technology infrastructure 400 may be a private network but may interface with a public network (such as the internet) to facilitate operative communication between computers executing on technology infrastructure 400 and computers executing outside of technology infrastructure 400.

FIG. 4 further depicts exemplary computing device 402. Computing device 402 depicts exemplary hardware that executes the logic that drives the various system components described herein. Servers and client devices may take the form of computing device 402. While shown as internal to technology infrastructure 400, computing device 402 may be external to technology infrastructure 400 and may be in operative communication with a computing device internal to technology infrastructure 400.

In accordance with aspects, system components such as a scoring engine, a modeling engine, client devices, servers, various database engines and database services, and other computer applications and logic may include, and/or execute on, components and configurations the same, or similar to, computing device 402.

Computing device 402 includes a processor 403 coupled to a memory 406. Memory 406 may include volatile memory and/or persistent memory. The processor 403 executes computer-executable program code stored in memory 406, such as software programs 415. Software programs 415 may include one or more of the logical steps disclosed herein as a programmatic instruction, which can be executed by processor 403. Memory 406 may also include data repository 405, which may be nonvolatile memory for data persistence. The processor 403 and the memory 406 may be coupled by a bus 409. In some examples, the bus 409 may also be coupled to one or more network interface connectors 417, such as wired network interface 419, and/or wireless network interface 421. Computing device 402 may also have user interface components, such as a screen for displaying graphical user interfaces and receiving input from the user, a mouse, a keyboard and/or other input/output components (not shown).

In accordance with aspects, services, modules, engines, etc., described herein may provide one or more application programming interfaces (APIs) in order to facilitate communication with related/provided computer applications and/or among various public or partner technology infrastructures, data centers, or the like. APIs may publish various methods and expose the methods, e.g., via API gateways. A published API method may be called by an application that is authorized to access the published API method. API methods may take data as one or more parameters or arguments of the called method. In some aspects, API access may be governed by an API gateway associated with a corresponding API. In some aspects, incoming API method calls may be routed to an API gateway and the API gateway may forward the method calls to internal services/modules/engines that publish the API and its associated methods.

A service/module/engine that publishes an API may execute a called API method, perform processing on any data received as parameters of the called method, and send a return communication to the method caller (e.g., via an API gateway). A return communication may also include data based on the called method, the method's data parameters and any performed processing associated with the called method.

API gateways may be public or private gateways. A public API gateway may accept method calls from any source without first authenticating or validating the calling source. A private API gateway may require a source to authenticate or validate itself via an authentication or validation service before access to published API methods is granted. APIs may be exposed via dedicated and private communication channels such as private computer networks or may be exposed via public communication channels such as a public computer network (e.g., the internet). APIs, as discussed herein, may be based on any suitable API architecture. Exemplary API architectures and/or protocols include SOAP (Simple Object Access Protocol), XML-RPC, REST (Representational State Transfer), or the like.

The various processing steps, logical steps, and/or data flows depicted in the figures and described in greater detail herein may be accomplished using some or all of the system components also described herein. In some implementations, the described logical steps or flows may be performed in different sequences and various steps may be omitted. Additional steps may be performed along with some, or all of the steps shown in the depicted logical flow diagrams. Some steps may be performed simultaneously. Some steps may be performed using different system components. Accordingly, the logical flows illustrated in the figures and described in greater detail herein are meant to be exemplary and, as such, should not be viewed as limiting. These logical flows may be implemented in the form of executable instructions stored on a machine-readable storage medium and executed by a processor and/or in the form of statically or dynamically programmed electronic circuitry.

The system of the invention or portions of the system of the invention may be in the form of a "processing device," a "computing device," a "computer," an "electronic device," a "mobile device," a "client device," a "server," etc. As used herein, these terms (unless otherwise specified) are to be understood to include at least one processor that uses at least one memory. The at least one memory may store a set of instructions. The instructions may be either permanently or temporarily stored in the memory or memories of the processing device. The processor executes the instructions that are stored in the memory or memories in order to process data. A set of instructions may include various instructions that perform a particular step, steps, task, or tasks, such as those steps/tasks described above, including any logical steps or logical flows described above. Such a set of instructions for performing a particular task may be characterized herein as an application, computer application, program, software program, service, or simply as "software." In one aspect, a processing device may be or include a specialized processor. As used herein (unless otherwise indicated), the terms "module," and "engine" refer to a computer application that executes on hardware such as a server, a client device, etc. A module or engine may be a service.

As noted above, the processing device executes the instructions that are stored in the memory or memories to process data. This processing of data may be in response to commands by a user or users of the processing device, in response to previous processing, in response to a request by another processing device and/or any other input, for example. The processing device used to implement the invention may utilize a suitable operating system, and instructions may come directly or indirectly from the operating system.

The processing device used to implement the invention may be a general-purpose computer. However, the processing device described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

It is appreciated that in order to practice the method of the invention as described above, it is not necessary that the processors and/or the memories of the processing device be physically located in the same geographical place. That is, each of the processors and the memories used by the processing device may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further aspect of the invention, be performed by a single component. Further, the processing performed by one distinct component as described above may be performed by two distinct components. In a similar manner, the memory storage performed by two distinct memory portions as described above may, in accordance with a further aspect of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity, i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing device what to do with the data being processed.

Further, it is appreciated that the instructions or set of instructions used in the implementation and operation of the invention may be in a suitable form such that the processing device may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing device, i.e., to a particular type of computer, for example. The computer understands the machine language.

Any suitable programming language may be used in accordance with the various aspects of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing device, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing device, utilized to hold the set of instructions and/or the data used in the invention may take on any of a variety of physical forms or transmissions, for example. Illustratively, the medium may be in the form of a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by a processor.

Further, the memory or memories used in the processing device that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing device or machines that are used to implement the invention. As used herein, a user interface includes any hardware, software, or combination of hardware and software used by the processing device that allows a user to interact with the processing device. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing device as it processes a set of instructions and/or provides the processing device with information. Accordingly, the user interface is any device that provides communication between a user and a processing device. The information provided by the user to the processing device through the user interface may be in the form of a command, a selection of data, or some other input, for example.

As discussed above, a user interface is utilized by the processing device that performs a set of instructions such that the processing device processes data for a user. The user interface is typically used by the processing device for interacting with a user either to convey information or receive information from the user. However, it should be appreciated that in accordance with some aspects of the system and method of the invention, it is not necessary that a human user actually interact with a user interface used by the processing device of the invention. Rather, it is also contemplated that the user interface of the invention might interact, i.e., convey and receive information, with another processing device, rather than a human user. Accordingly, the other processing device might be characterized as a user. Further, it is contemplated that a user interface utilized in the system and method of the invention may interact partially with another processing device or processing devices, while also interacting partially with a human user.

It will be readily understood by those persons skilled in the art that the present invention is susceptible to broad utility and application. Many aspects and adaptations of the present invention other than those herein described, as well as many variations, modifications, and equivalent arrangements, will be apparent from or reasonably suggested by the present invention and foregoing description thereof, without departing from the substance or scope of the invention.

Accordingly, while the present invention has been described here in detail in relation to its exemplary aspects, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such aspects, adaptations, variations, modifications, or equivalent arrangements.

The invention claimed is:

1. A method comprising:
   receiving, at a classification data store, a plurality of subject text strings, a plurality of associated class text strings, and a relationship of a description of a class of each class text string, the plurality of subject text strings each comprising a name of an organization, the class text strings each comprising a merchant category code that describe the class;
   generating, by a machine learning model, a subject vector embedding based on each of the plurality of subject text strings and a class vector embedding based on each of the plurality of class text strings;
   receiving, at a scoring engine from the machine learning model and as input to a binary search process, each of the subject vector embeddings and each of the class vector embeddings;
   generating, by the scoring engine, a similarity score, wherein the similarity score is a measurement of similarity between the subject vector embedding and the class vector embedding;
   determining, by the scoring engine, that the similarity score is below a threshold value;
   splitting, by the scoring engine, the plurality of subject text strings into a first new plurality of subject text strings and a second new plurality of subject text strings;
   receiving, by the scoring engine, a new subject vector embedding, wherein the new subject vector embedding is generated from the first new plurality of subject text strings;
   calling, by the scoring engine, the binary search process using the new subject vector embedding and the class vector embedding as input to the binary search process;
   generating, by the scoring engine executing the binary search process and from the classification data store, two or more subject text strings of the plurality of subject text strings that are concatenated with a separation character and removing the separation character;
   providing, from the scoring engine and to a large language model, the concatenated string and one class text string of the class text strings, the one class string being associated with the class vector embedding;
   generating, by the large language model in communication with the classification data store and as a result of a query, the concatenated string using the one class text string as a lookup key, the large language model determining a subject text string from the query is similar to the one class text string.

2. The method of claim 1, wherein the plurality of subject text strings are split at one of the separation character between each subject text string of the plurality of subject text strings.

3. A system comprising at least one computer including a processor and a memory, wherein the at least one computer is configured to:
   receive, at a classification data store, a plurality of subject text strings, a plurality of associated class text strings, and a relationship of a description of a class of each class text string, the plurality of subject text strings each comprising a name of an organization, the class text strings each comprising a merchant category code that describe the class;

generate, by a machine learning model, a subject vector embedding based on each of the plurality of subject text strings and a class vector embedding based on each of the plurality of class text strings;

receive, at a scoring engine from the machine learning model and as input to a binary search process, each of the subject vector embeddings and each of the class vector embeddings;

generate, by the scoring engine, a similarity score, wherein the similarity score is a measurement of similarity between the subject vector embedding and the class vector embedding;

determine, by the scoring engine, that the similarity score is below a threshold value;

split, by the scoring engine, the plurality of subject text strings into a first new plurality of subject text strings and a second new plurality of subject text strings;

receive, by the scoring engine, a new subject vector embedding, wherein the new subject vector embedding is generated from the first new plurality of subject text strings;

call, by the scoring engine, the binary search process using the new subject vector embedding and the class vector embedding as input to the binary search process;

generate, by the scoring engine executing the binary search process and from the classification data store, two or more subject text strings of the plurality of subject text strings that are concatenated with a separation character and removing the separation character;

provide, from the scoring engine and to a large language model, the concatenated string and one class text string of the class text strings, the one class string being associated with the class vector embedding;

generate, by the large language model in communication with the classification data store and as a result of a query, the concatenated string using the one class text string as a lookup key, the large language model determining a subject text string from the query is similar to the one class text string.

4. The system of claim 3, wherein the plurality of subject text strings are split at one of the separation characters between each subject text string of the plurality of subject text strings.

5. A non-transitory computer readable storage medium, including instructions stored thereon, which instructions, when read and executed by one or more computer processors, cause the one or more computer processors to perform steps comprising:

receiving, at a classification data store, a plurality of subject text strings, a plurality of associated class text strings, and a relationship of a description of a class of each class text string, the plurality of subject text strings each comprising a name of an organization, the class text strings each comprising a merchant category code that describe the class;

generating, by a machine learning model, a subject vector embedding based on each of the plurality of subject text strings and a class vector embedding based on each of the plurality of class text strings;

receiving, at a scoring engine from the machine learning model and as input to a binary search process, each of the subject vector embeddings and each of the class vector embeddings;

generating, by the scoring engine, a similarity score, wherein the similarity score is a measurement of similarity between the subject vector embedding and the class vector embedding;

determining, by the scoring engine, that the similarity score is below a threshold value;

splitting, by the scoring engine, the plurality of subject text strings into a first new plurality of subject text strings and a second new plurality of subject text strings;

receiving, by the scoring engine, a new subject vector embedding, wherein the new subject vector embedding is generated from the first new plurality of subject text strings;

calling, by the scoring engine, the binary search process using the new subject vector embedding and the class vector embedding as input to the binary search process;

generating, by the scoring engine executing the binary search process and from the classification data store, two or more subject text strings of the plurality of subject text strings that are concatenated with a separation character and removing the separation character;

providing, from the scoring engine and to a large language model, the concatenated string and one class text string of the class text strings, the one class string being associated with the class vector embedding;

generating, by the large language model in communication with the classification data store and as a result of a query, the concatenated string using the one class text string as a lookup key, the large language model determining a subject text string from the query is similar to the one class text string.

6. The non-transitory computer readable storage medium of claim 5, wherein the plurality of subject text strings are split at one of the separation characters between each subject text string of the plurality of subject text strings.

* * * * *